United States Patent [19]

Smeltzer et al.

[11] 4,105,194
[45] Aug. 8, 1978

[54] PUMP MECHANISM FOR A COMBINED SELF-LEVELING SHOCK ABSORBER AND FLUID SPRING UNIT

[75] Inventors: Paul Smeltzer, Napierville; Kris Sharma, Glen Ellyn; David A. Daneck, Elgin; Sellers B. McNally, Barriington, all of Ill.

[73] Assignee: Maremont Corporation, Chicago, Ill.

[21] Appl. No.: 802,312

[22] Filed: Jun. 1, 1977

[51] Int. Cl.² .......................... F16F 9/34; B60G 17/00
[52] U.S. Cl. ............................... 267/64 R; 137/516.29; 137/543.15; 267/DIG. 2; 280/714
[58] Field of Search ............ 267/64 R, DIG. 2, 65 D; 137/516.29, 543.15; 280/714

[56] References Cited

U.S. PATENT DOCUMENTS

| 1,839,403 | 1/1932 | MacFadden | 137/543.15 |
| 3,836,132 | 9/1974 | McNally et al. | 267/64 R |

FOREIGN PATENT DOCUMENTS 1,269,904  6/1968  Fed. Rep. of Germany .... 267/DIG. 2

Primary Examiner—George E. A. Halvosa
Attorney, Agent, or Firm—Cushman, Darby & Cushman

[57] ABSTRACT

A self-leveling combined shock absorber and liquid spring assist unit comprising a pair of tubular structures of the piston and cylinder shock absorber type, one of which defines a load bearing spring chamber and the other of which includes an elongated displacement member for the spring chamber, the displacement member being tubular and cooperating with a pump rod to provide a pump-up function for the unit. An improved pump check valve arrangement between the end surface of the displacement member and the exterior annular surface of the pump rod is provided for controlling the flow of hydraulic fluid between the pump chamber and the load bearing spring chamber which comprises an annular body of elastomeric material having an annular anti-extrusion washer of rigid material embedded therein which is spring urged into sealing engagement by a coil spring and held in assembled relation by a rigid tubular element fixed to the exterior periphery of the displacement member.

8 Claims, 5 Drawing Figures

PUMP MECHANISM FOR A COMBINED SELF-LEVELING SHOCK ABSORBER AND FLUID SPRING UNIT

This invention relates to combined shock absorber and fluid spring units and more particularly to improvements in the pumping mechanism embodied in self-leveling units of the type disclosed in U.S. Pat. No. 3,836,132.

The unit as disclosed in the above-mentioned U.S. patent is described in its preferred form as being an assist unit of the type which is adapted to replace the shock absorber unit in a conventional suspension system. The assist unit has built into it components operable to provide the shock absorbing or damping function normally provided by the replaced shock absorber and an assist spring or load supporting function. In the particular embodiment shown, the spring function is provided by a liquid spring unit in which the displacement is performed by a member separate from the piston rod of the unit. Of primary importance in connection with the present invention is the fact that the unit also provides a self-contained self-leveling function for maintaining the unit at a mean operating height throughout a wide range of static load conditions in the vehicle. The self-leveling function is obtained by providing a pump mechanism which functions during the relative telescopic movement of the unit to pump hydraulic fluid into the liquid spring or load bearing chamber. In the particular arrangement disclosed in the aforesaid patent, there is provided a second positive displacement pump mechanism which functions in the opposite direction, namely, to move hydraulic fluid from the load bearing chamber back to a reservoir. The specific arrangement in the patent is that the pump-down mechanism has a displacement volume approximately twice the displacement volume of the pump-up mechanism whereas the pump-down mechanism has a total stroke which is approximately one-half that of the pump-up mechanism. With this arrangement the pump-up mechanism provides for the filling of a pump chamber with low pressure hydraulic fluid from a low pressure reservoir source during the movement of the tubular structures of the unit in an extending telescopic relation and the pressurization and movement of the hydraulic fluid from the pump chamber into the load bearing chamber during the movement in the contracting telescopic relation.

The components of the pump-up mechanism must therefore operate under conditions where there are extreme pressure differentials in the hydraulic fluid contacting the component parts. This is particularly true in view of the fact that a liquid spring is utilized to provide the spring function. There are many instances in the overall operation of the unit where very high pressures greatly in excess of the pressures normally encountered in air spring units are applied by the pump-up mechanism of the unit. In order to properly function in an environment where such excessive pressure differentials are encountered, special pump components must be utilized.

The pump mechanism as described in the above-mentioned patent includes a pump tube, the interior of which defines the exterior of the pump chamber. Of significance is the fact that the pump tube also functions as the displacement member for the load bearing spring chamber of the unit. The displacement element of the pump mechanism consists of a cylindrical rod which extends into the pump tube. A check valve and seal assembly serves to control flow between the pump chamber and the load bearing spring chamber which includes a resilient member having a sleeve valve portion which engages with the exterior cylindrical surface of the free end portion of the pump tube over an extensive area and an integral sealing portion which extends radially inwardly from the sleeve valve portion. The exterior of the resilient member is in continuous communication with the hydraulic fluid under high pressure within the load bearing spring chamber and the interior of the resilient member is physically supported against extrusion as a result of such high pressure communication by a rigid anti-extrusion member operable to move in response to the establishment of a pump pressure in excess of load pressure to permit flow from the pump chamber to the load chamber between the sleeve valve portion and the cylindrical surface engaged thereby. Because of the extensive area of engagement, reverse flow is prevented therebetween even though foreign particles should become lodged between the interengaged surfaces. More specifically, due to the elastic nature of the material from which the resilient member is made and the axial stress induced into the same by the manner in which it is clamped to the exterior end of the pump tube, there is maintained an axial compressive force on the anti-extrusion member acting on the end of the pump tube. When the spring load bearing chamber is pressurized, the body of the resilient member provides a peripheral seal at the circumferential juncture or interface between the anti-extrusion member and the end of the pump tube. This prevents the pressurized fluid from leaking between the metal-to-metal interface and thus flowing from the load bearing spring chamber to the pump chamber.

However, the axial compression load which provided the check valve function could not be accurately maintained. The elastomeric nature of the material utilized in the sleeve valve was subject to swelling which greatly affected the check valve spring rate provided by the member. Similar effects were obtained as a result of the thermal conditions. Moreover, low temperature, highly viscous oil could cause the sleeve valve to balloon out as the viscous fluid was pumped through the port. At extremely low temperatures, the eleastomeric material becomes stiff, and tends to shrink and thus induces greater compressive loads which cause higher pumping loads.

An object of the present invention is to provide a pump mechanism for use in a unit of the type described which substantially alleviates the disadvantages enunciated above with respect to the pump-up mechanism of the patented disclosure while maintaining to a large measure the anti-fouling characteristics thereof. In accordance with the principles of the present invention, this objective is obtained by providing an annular body of elastomeric material having an interior annular surface slidably sealingly engaging the exterior annular surface of the pump rod and terminating axially outwardly of the displacement member or pump tube in a free end surface, the annular body of elastomeric material having an opposite end surface engageable with the end surface of the displacement member for providing the check valve function. Embedded within the annular body of elastomeric material is an annular washer of rigid material which provides the anti-extrusion function and is disposed in a position to engage the end surface of the displacement member radially inwardly of the position of engagement of the elastomeric body therewith and to slidably engage the exterior annular surface of the pump rod axially inwardly with respect to the engagement of the elastomeric body therewith. The present pump components also include a rigid tubular element fixed to the exterior periphery of the pump tube which extends axially outwardly beyond the end surface thereof in surrounding relation to the elastomeric body. The rigid tubular element has an end wall spaced from the free end surface of the elastomeric body which is centrally apertured to receive the pump rod therethrough. Finally, a metallic coil spring is disposed in surrounding relation to the pump rod between the apertured end wall and the free surface of the elastomeric body so as to apply a predetermined spring force on the elastomeric body when the latter is disposed with its opposite end surface in engagement with the end surface of the displacement member. With this arrangement, the spring force of the check valve can be more accurately controlled both in manufacture and in operation.

The small differences in the deflection and installed length of the spring produces relatively small changes in the axial load exerted as compared with the other arrangement. Moreover, the seating surfaces providing the check valve function tend to be self-cleaning so that the fouling effects of dirt particles and the like do not tend to prevent the proper functioning of the component parts.

Accordingly, it is a further object of the present invention to provide an improved pump mechanism for a unit of the type described which is simple in construction, effective in operation and economical to manufacture and maintain.

These and other objects of the present invention will become more apparent during the course of the following detailed description and appended claims.

The invention may best be understood with reference to the accompanying drawings, wherein an illustrative embodiment is shown.

Figure 1:
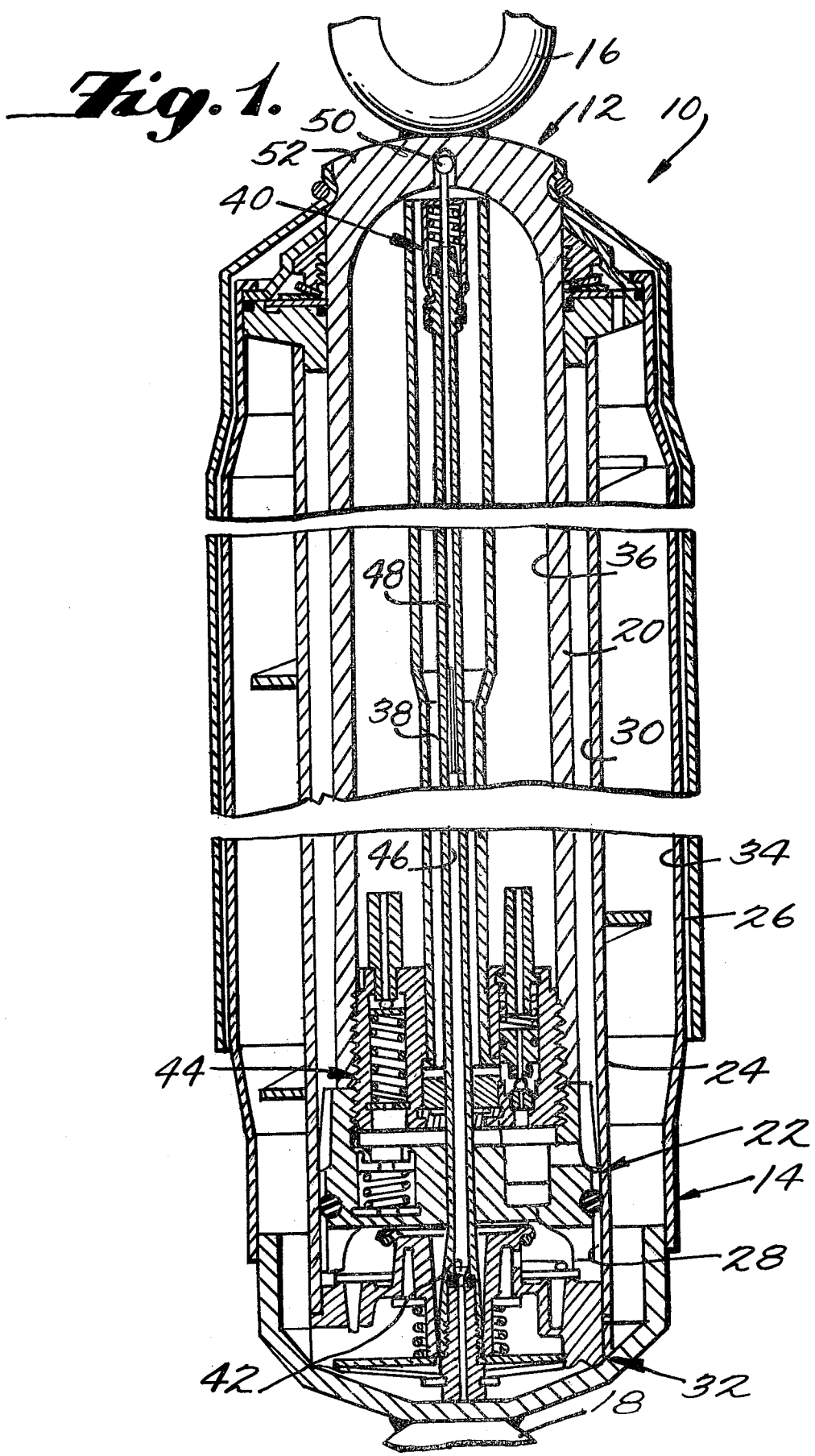
FIG. 1 is a vertical sectional view of a self-contained, self-leveling combined shock absorber and fluid spring assist unit combining therein the improved pump mechanism embodying the principles of the present invention, the parts being shown in a position of substantially fully retracted telescopic relation.
Figure 2:
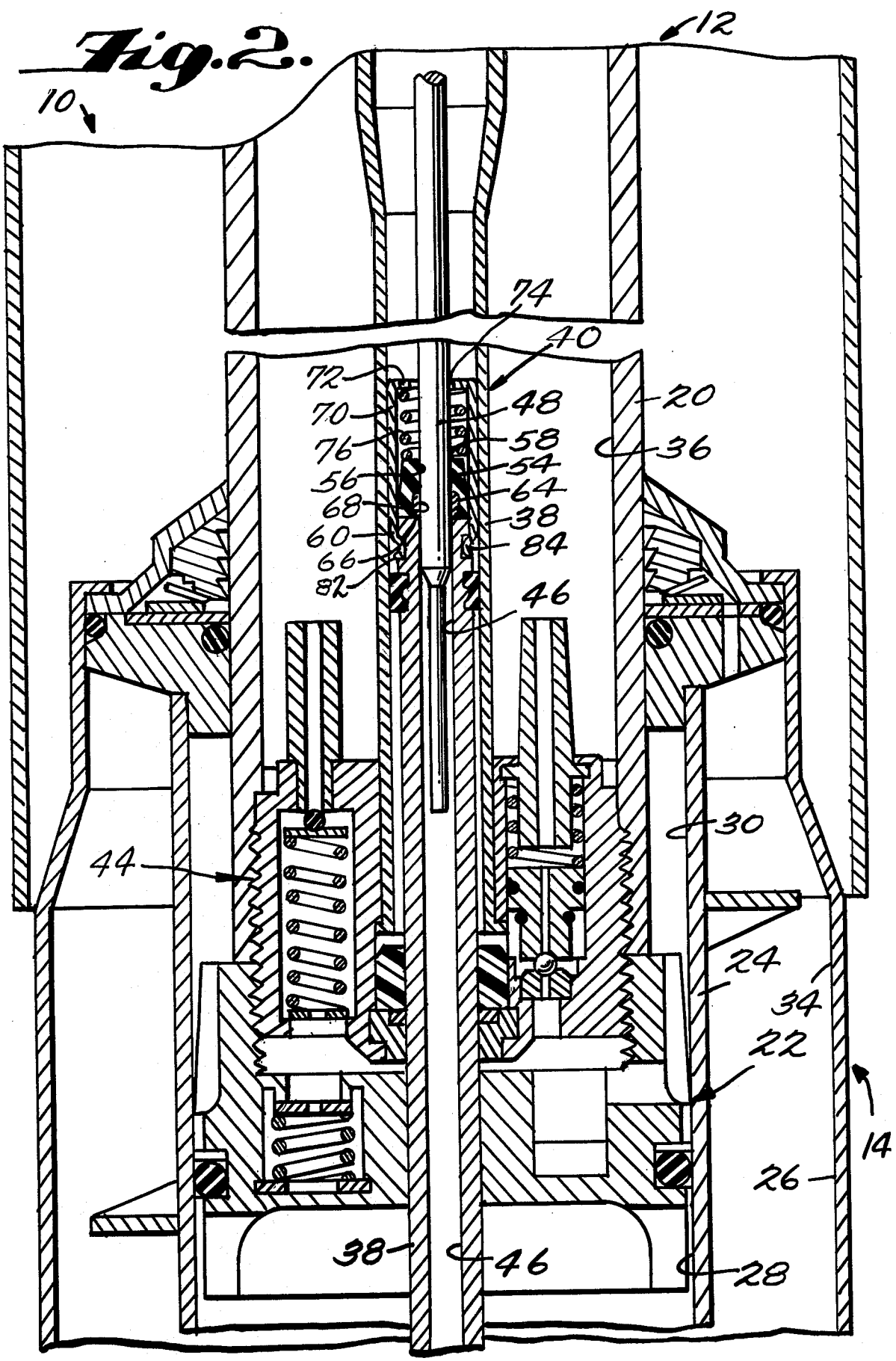
FIG. 2 is an enlarged fragmentary vertical sectional view illustrating the position of the parts in substantially fully extended telescopic relation.

Referring now more particularly to the drawings, there is shown in FIG. 1 a self-contained, self-leveling combined shock absorber and fluid spring assist unit, generally indicated at 10, embodying the principles of the present invention. It will be understood that in accordance with the principles of the present invention, the unit 10 is constructed in accordance with the teachings of U.S. Pat. No. 3,836,132, except for the pump-up mechanism components hereinafter to be described, and hence the disclosure of the aforesaid patent is hereby incorporated by reference into the present specification. In the drawings, all of the detailed components of the unit 10 are illustrated and only those components necessary to the understanding of the principles of the present invention relating to the pump-up mechanism will be described in detail in the present specification, it being understood that reference may be had to the specification of U.S. Pat. No. 3,836,132 for purposes of obtaining a detailed understanding of all of the details of the components of the unit 10. For present purposes, it is sufficient to note that the unit 10 includes two tubular structures, generally indicated at 12 and 14, which are mounted for longitudinal movement with respect to each other in contracting and extending telescopic relation. Mounted on the outer ends of each of the tubular structures are connecting elements 16 and 18 which serve to connect the unit between the sprung and unsprung masses of a vehicle having a conventional suspension system in place of a conventional shock absorber.

As shown, the elements 16 and 18 are conventional rings and when the unit is mounted between the sprung and unsprung masses of the vehicle the tubular structures 12 and 14 will move in contracting telescopic relation in response to the movement of the masses toward one another and in extending telescopic relation in response to the movement of the masses in a direction away from each other. In the preferred embodiment shown, the tubular structure 12 includes a hollow piston rod 20 having a piston assembly 22 mounted on the inner end thereof. The piston assembly 22 is adapted to slidably move within an inner cylindrical member 24 forming a part of the tubular structure 14, which also includes an outer tubular member 26.

The piston assembly 22 divides the inner cylindrical member 24 into a lower compression space 28 and an upper rebound space 30. These spaces 28 and 30 are filled with hydraulic fluid and are comparable to the compression and rebound spaces within a conventional tubular shock absorber. In order to provide for the damping function, the piston assembly 22 is provided with suitable valving which provides for the flow of fluid between the compression and rebound spaces 28 and 30. Likewise, a base valve assembly, generally indicated at 32, is provided in the lower end of the tubular structure 14 for controlling the flow of fluid into and out of the compression space 28 from a reservoir space 34 provided between the inner cylindrical member 24 and the outer tubular member 26.

The interior of the piston rod 20 defines the exterior of a load bearing spring chamber 36. The fluid spring displacement function is provided with respect to the load bearing spring chamber 36 by an elongated tubular displacement member 38 which also forms the pump tube of the pump mechanism, generally indicated at 40, embodying the principles of the present invention. The displacement member 38 has its lower end mounted within the base valve assembly 32 so as to communicate with the reservoir space 34.

A suitable check valve 42 is formed in the lower interior of the tubular member 38. The tubular member extends upwardly from the lower end of the tubular structure 14 into the hollow piston rod 20 of the tubular structure 12. An insert assembly, generally indicated at 44, is mounted within the lower end of the hollow piston rod 20 in a position above the piston assembly 22 and provides a sealing function for the exterior periphery of the displacement member 38, as well as the pump-down function for the load bearing spring chamber 36.

The interior surface of the tubular displacement member 38 disposed above the lower check valve 42 defines the exterior periphery of a pump chamber 46 forming a part of the pump mechanism 40. A positive displacement function associated with the pump chamber is provided by a pump rod 48. The pump rod is mounted in the upper end of the tubular structure 12 in the manner specified in U.S. Pat. No. 3,836,132, which includes an end ball 50 suitably retained within the upper end wall 52 of the hollow piston rod 20, in a manner which prevents the transmission of torque loads to the pump rod but insures that the pump rod will move with the tubular structure 12 in telescoping relation to the pump tube or displacement member 38 as the tubular structure 12 moves in telescopic relation with the tubular structure 14.

During the relative longitudinal movement of the tubular structures 12 and 14 in extending telescopic relation, pump rod 48 moves outwardly of the pump tube 38, thus increasing the volume of the pump chamber 46 which increasing volume is filled with hydraulic fluid from the reservoir space 34 by flow past the inlet check valve 42. During the relative longitudinal movement of the tubular structures 12 and 14 in contracting telescopic relation, the pump rod 48 moves longitudinally within the pump tube 38, thus decreasing the volume of the pump chamber 46 and causing the liquid within the pump chamber to be pressurized to a value equal to or greater than the pressure of the hydraulic fluid within the load bearing spring chamber 36 so as to flow from the pump chamber 46 into the load bearing spring chamber 36.

Figure 3:
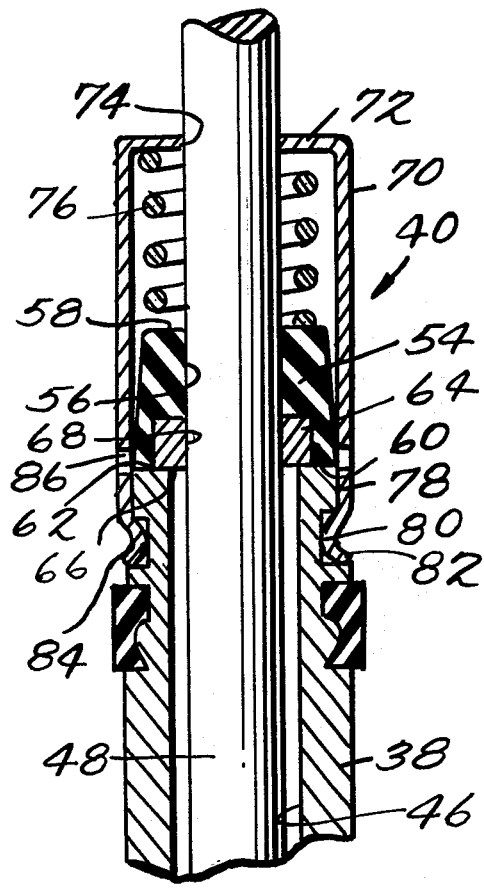
FIG. 3 is an enlarged fragmentary vertical sectional view illustrating the improved pumping components embodying the present invention illustrating the position the parts assume when the pump chamber is sealed out of communication from the surrounding load bearing spring chamber.
Figure 4:
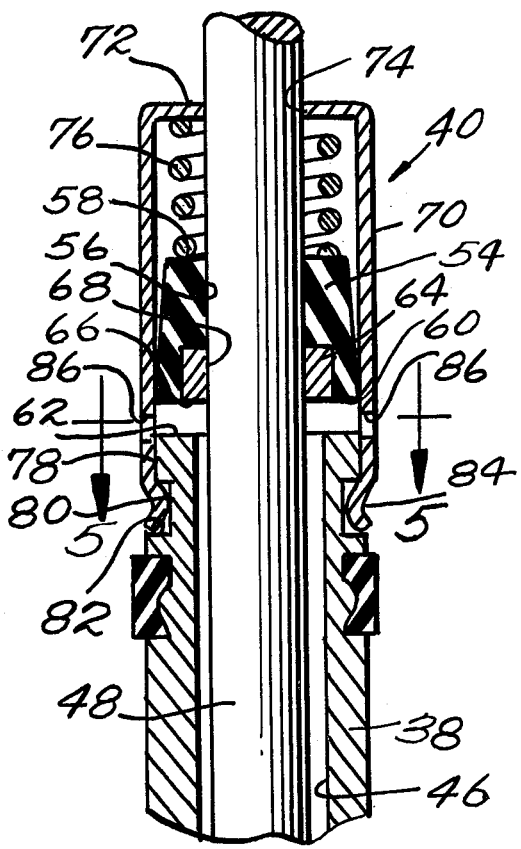
FIG. 4 is a view similar to FIG. 3, illustrating the position the parts assume when the pump chamber is disposed in flow communicating relation with the load bearing spring chamber.
Figure 5:
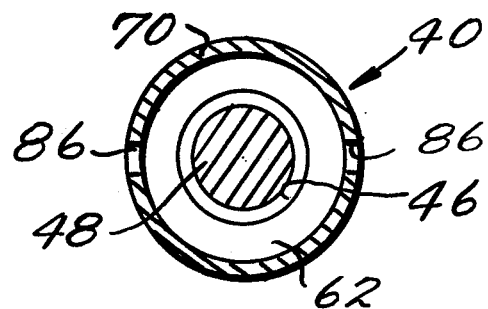
FIG. 5 is a sectional view taken along the line 5—5 of FIG. 4.

The pump mechanism 40 embodying the principles of the present invention provides a check valving function between the pump chamber 46 and the load bearing spring chamber 36. As best shown in FIGS. 3-5, the components of the mechanism 40 which provide the check valve function include an annular body 54 of elastomeric material. It will be understood that the body may be formed of any suitable elastomeric material, a preferred example being polyurethane or the like. The body 54 includes an interior annular surface 56 of cylindrical configuration which slidably sealingly engages the exterior annular surface of the pump rod 48 which is likewise of cylindrical configuration (except for the free end portion thereof which is of reduced diameter, the purpose and function of which is fully explained in the aforesaid patent).

The annular body 54 has a free end surface 58 and an opposite end surface 60 which is adapted to engage a radially extending end surface 62 formed on the free end of the pump tube or displacement member 38. Embedded within the annular elastomeric body 54 is an annular washer 64 of rigid material, such as sintered metal or the like. The annular washer 64 includes an end surface 66 which is adapted to engage the end surface 62 of the displacement member 38 at a position radially inwardly of the position of the engagement of the surface 60 of the elastomeric body 54 therewith and an interior cylindrical surface 68 which slidably engages the exterior periphery of the pump rod 48 at a position axially inwardly with respect to the position of engagement of the surface 56 of the elastomeric body 54 therewith. It can thus be seen that the annular washer 64 is disposed in a position which will prevent the extrusion of the elastomeric body 54 axially inwardly into the pump chamber 46 defined between the interior cylindrical surface of the displacement member or pump tube 38 and the exterior cylindrical surface of the pump rod 48.

Mounted in surrounding relation to the exterior periphery of the displacement member 38 and extending axially outwardly beyond the end surface 62 thereof in surrounding relation to the elastomeric body 54 is a rigid tubular element 70. The rigid tubular element 70 includes an end wall 72 spaced from the end surface 62 which is centrally apertured, as indicated at 74, to receive the pump rod 48 therethrough. Mounted in surrounding relation to the pump rod 48 between the apertured end wall 72 and the free end surface 58 of the elastomeric body 54 is a metallic coil spring 76.

The exterior periphery of the pump tube or displacement member 38 adjacent the end surface 62 is formed with a portion of reduced diameter 78 extending inwardly from the surface 62 and an annular groove 80 communicating therewith which terminates in a shoulder 82 facing axially outwardly toward the end surface 62. The tubular element 70 has an interior diameter size sufficient to fit over the reduced portion 78 so that the extremity thereof will engage the shoulder 82. The tubular element 70 is thus assembled over the elastomeric body 54 having the anti-extrusion washer 64 embedded therein and the coil spring 76 so that when the extremity thereof engages the shoulder 82, the end wall 72 will engage the adjacent end of the coil spring 76 and apply a predetermined load to the spring which, in turn, exerts a predetermined compressive force to the elastomeric body 54. The tubular element 70 is retained in this position by spinning the periphery thereof coextensive with the groove 80 radially inwardly into the groove, as indicated at 84. Finally, it will be noted that the tubular element 70 includes a plurality of outlet openings 86 extending radially therethrough at a position generally coextensive with the position of the interengagement between the end surface 62 of the pump tube 38 and the end surface 60 of the elastomeric body 54.

In operation, during the relative movement between the tubular structure 12 and tubular structure 14 in extending telescopic relation, pump rod 48 moves outwardly of the pump tube 38, thus increasing the volume of the pump chamber 46 which has the effect of drawing hydraulic fluid within reservoir space 34 into the pump chamber past the inlet check valve 24. The pressure conditions contained within the load bearing spring chamber 36 are communicated through the openings 86 to the exterior surface of the elastomeric body 54 which imposes upon this body a force in addition to the axial force of the spring 76 tending to maintain the sealed relation between the pump chamber 46 and the load bearing spring chamber 36 provided by the elastomeric body 54. During the relative movement between the tubular structures 12 and 14 in a contracting telescopic relation, pump rod 48 will move into the pump tube or displacement member 38, thus decreasing the volume of the pump chamber 46. Since the liquid in the pump chamber cannot flow past the inlet check valve 42, the pressure of the hydraulic fluid within the pump chamber 46 is immediately increased until it reaches a value sufficient to overcome the combination of pressure and spring forces acting on the elastomeric body 54. The elastomeric body 54, together with the rigid washer 64 embedded therein, are thus moved axially away from the end surface 62 as shown in FIG. 4, so as to provide for the flow of pressurized hydraulic fluid from the pump chamber 46 into the load bearing spring chamber 36 through the openings 86.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A self-leveling combined shock absorber and fluid spring assist unit adapted to be mounted in place of a conventional shock absorber between the sprung and unsprung masses of a vehicle having a conventional suspension system, said unit comprising:

a pair of tubular structures mounted for longitudinal movement with respect to each other in contracting and extending telescopic relation, means on the outer ends of said tubular structures for effecting the connection thereof between the sprung and unsprung masses of the vehicle so that said tubular structures move in contracting telescopic relation in response to the movement of said masses toward one another and said tubular structures move in extending telescopic relation in response to the movement of said masses in a direction away from each other, said tubular structures including means defining a load bearing spring chamber including an elongated displacement member and annular wall means disposed in telescopic sliding relation to said displacement member so that said load bearing spring chamber is decreased in volume by said displacement member in response to the movement of said tubular structures in contracting telescopic relation and is increased in volume by said displacement member in response to the movement of said tubular structures in extending telescopic relation, hydraulic fluid within said load bearing spring chamber the pressure of which increases in response to the movement of said tubular structures in contracting telescopic relation and decreases in response to the movement of said tubular structures in extending telescopic relation so as to provide a load bearing force acting on the effective area of said displacement member which varies in accordance with the relative position of movement of said tubular structures and the amount of hydraulic fluid within said load bearing spring chamber, said displacement member being tubular and having an interior annular surface defining the exterior periphery of a pump chamber and a radially extending end surface communicating with one end of said interior annular surface, a pump rod disposed in telescoping relation with said tubular displacement member having an exterior annular surface defining the interior periphery of the pump chamber, and pump valve means between the end surface of said displacement member and the exterior annular surface of said rod for controlling the flow of hydraulic fluid between said pump chamber and said load bearing spring chamber, the improvement which comprises said pump valve means comprising:

an annular body of elastomeric material having an interior annular surface slidably sealingly engaging the exterior annular surface of said pump rod and terminating axially outwardly of said displacement member in a free end surface, said annular body having an opposite end surface engageable with the end surface of said displacement member for preventing flow of hydraulic fluid in direction from said load bearing spring chamber to said pump chamber.

an annular washer of rigid material embedded within said annular elastomeric body in a position to engage the end surface of said displacement member radially inwardly of the position of engagement of said elastomeric body therewith and to slidably engage the exterior annular surface of said pump rod axially inwardly with respect to the engagement of said elastomeric body therewith so as to prevent the extrusion of said elastomeric body axially inwardly between the interior annular surface of said displacement member and the exterior annular surface of said pump rod as a result of high pressure hydraulic fluid conditions within said load bearing spring chamber with respect to said pump chamber, a rigid tubular element separate from but fixed to the exterior periphery of said displacement member and extending axially outwardly beyond the end surface thereof in surrounding relation to said elastomeric body, said rigid tubular element having an end wall spaced from the free end surface of said elastomeric body centrally apertured to receive said pump rod therethrough, and a metallic coil spring disposed in surrounding relation to said pump rod between said apertured end wall and the free end surface of said elastomeric body so as to apply a predetermined spring force on said elastomeric body when the latter is disposed with its opposite end surface in engagement with the end surface of said displacement member.

2. The improvement as defined in claim 1 wherein said tubular element includes a cylindrical wall having openings extending radially therethrough at an axial position generally corresponding to the position of engagement of the opposite end surface of said annular body with the end surface of said displacement member.

3. The improvement as defined in claim 2 wherein the exterior periphery of said displacement member includes a cylindrical portion of reduced diameter extending from said end surface and an annular groove communicating with said reduced portion terminating in a shoulder facing axially outwardly toward said end surface, said tubular element having an end edge abutting said shoulder and an adjacent annular end portion spun radially inwardly into said annular groove.

4. The improvement as defined in claim 2 wherein said openings include a pair of diametrically opposed circular openings.

5. The improvement as defined in claim 2 wherein said elastomeric material is polyurethane.

6. The improvement as defined in claim 1 wherein the exterior periphery of said displacement member includes a cylindrical portion of reduced diameter extending from said end surface and an annular groove communicating with said reduced portion terminating in a shoulder facing axially outwardly toward said end surface, said tubular element having an end edge abutting said shoulder and an adjacent annular end portion spun radially inwardly into said annular groove.

7. The improvement as defined in claim 6 wherein said elastomeric material is polyurethane.

8. The improvement as defined in claim 1 wherein said elastomeric material is polyurethane.

* * * * *